United States Patent [19]

Brockman et al.

[11] Patent Number: 5,341,613
[45] Date of Patent: Aug. 30, 1994

[54] STORAGE TERMINAL SHELTER, INCLUDING SIDE CURTAIN ASSEMBLY FOR TRUCK/TRAILER HINGE GAP CLOSURE

[75] Inventors: Thomas R. Brockman, Kenton; Mark Dillon, Upper Sandusky, both of Ohio

[73] Assignee: Fairborn USA Inc., Upper Sandusky, Ohio

[21] Appl. No.: 994,747

[22] Filed: Dec. 22, 1992

[51] Int. Cl.$^5$ .............................................. E04H 14/00
[52] U.S. Cl. ...................................... 52/173.2; 52/71
[58] Field of Search ................. 52/173.2, 71, 2.12; 160/181, 124

[56] References Cited

U.S. PATENT DOCUMENTS

| | | | |
|---|---|---|---|
| 3,638,667 | 2/1972 | Frommelt et al. | 52/173.2 |
| 3,915,183 | 10/1975 | Frommelt . | |
| 4,062,157 | 12/1977 | Potthoff | 52/173.2 |
| 4,070,801 | 1/1978 | O'Neal | 52/173.2 X |
| 4,574,543 | 3/1986 | Crosson | 52/173.2 |
| 4,601,142 | 7/1986 | Frommelt | 52/173.2 |
| 4,638,612 | 1/1987 | Bennett . | |
| 4,711,059 | 12/1987 | Layne . | |
| 4,805,362 | 2/1989 | Frommelt . | |
| 4,873,800 | 10/1989 | Frommelt et al. | 52/173.2 |
| 5,185,977 | 2/1993 | Brockman et al. | 52/173.2 |

*Primary Examiner*—Peter M. Cuomo
*Assistant Examiner*—Jerry Redman
*Attorney, Agent, or Firm*—David H. Semmes

[57] ABSTRACT

A loading dock shelter with hinge gap closure wherein reinforced side curtains seal corner/hinge areas, as a truck/trailer is backed into the loading dock, to thereby form a protective weather seal for the dock. Excessive pull on opposed side curtains is compensated by a pair of spring-loaded hinge assemblies, connecting the respective curtains to each shelter side frame of the front walls. Hinge gap closures having side curtains for right and left portions of the shelter are each adapted to set the curtains parallel to the door of the dock in the normal closed position, when the dock is not in use. When a trailer is backed into the dock, reverse mobility of the vehicle causes the side curtains to be forcibly deflected from their normal aligned and inoperative position, to extend them along the inside of respective trailer swing doors when open, whereupon a collapsible wedge on the extreme end of each side curtain encompasses and plugs the dock gap, created by the truck and its swing doors, preparatory to and during loading and off-loading. Respective side curtain hinges function to close in transverse extension of the side frame of the shelter when it is not in use. When in use, the hinges extend themselves arcuately outward from the side frame of the shelter toward the trailer body and its exposed swing door. Each attached side curtain is thus extended inwardly to seal the dock gap between open trailer doors and shelter. An elongated collapsible pad on the free end of the side curtain, is coactively engaged by the side wall of the vehicle, its door hinge and the open door of the service vehicle.

1 Claim, 3 Drawing Sheets

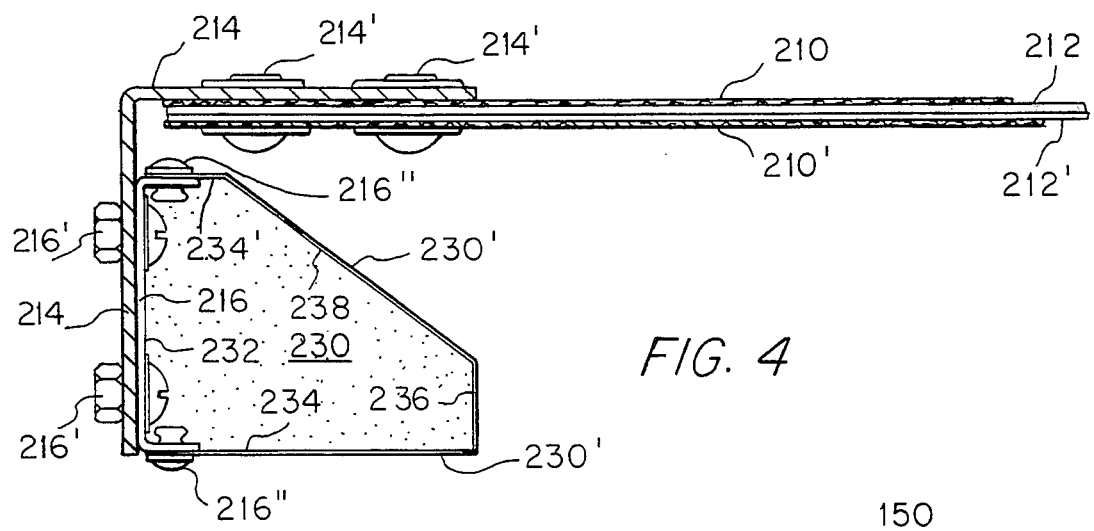
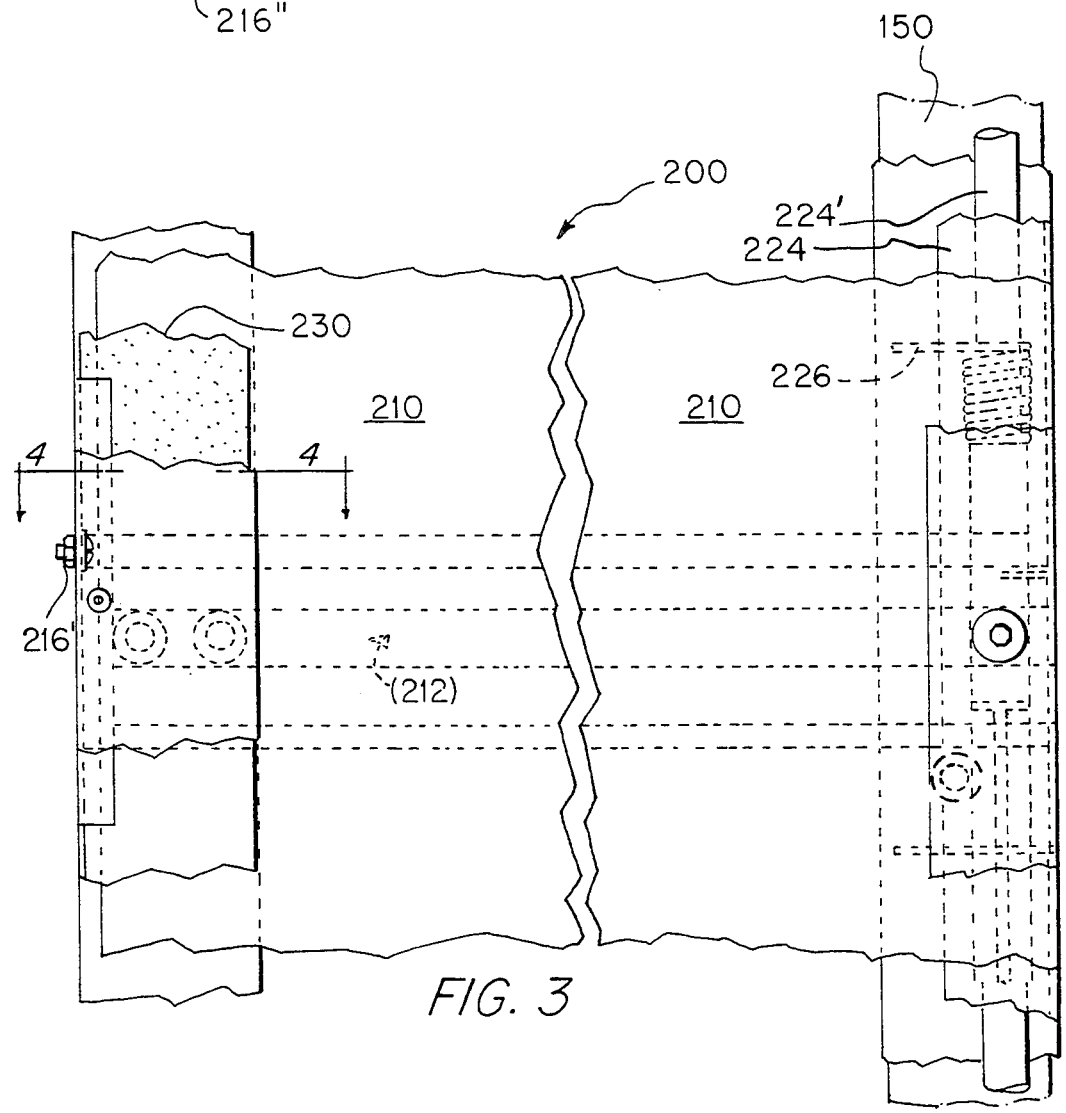

STORAGE TERMINAL SHELTER, INCLUDING SIDE CURTAIN ASSEMBLY FOR TRUCK/TRAILER HINGE GAP CLOSURE

CROSS REFERENCE TO RELATED APPLICATIONS

This invention is related to that which is defined in U.S. Pat. No. 5,185,977 filed May 8, 1992; inventors, Thomas A. Brockman and Mark Dillon; entitled: STORAGE TERMINAL SHELTER, INCLUDING SIDE CURTAIN ASSEMBLY FOR TRUCK/TRAILER HINGE GAP CLOSURE.

BACKGROUND OF THE INVENTION

In the loading and off-loading of trucks, more specifically, tractor-trailer trucks, it is desirable to seal the area between terminal dock and/or shelter against inclement weather. At the same time, it is important to provide such a combined dock seal and shelter as will be able to withstand substantial vehicular abuse. Accordingly, the present invention is adapted to provide at a given warehouse or building dock, a protective unit that presents a weather-tight seal when deflected by trailer or truck, wherein its rear doors are open and folded back along the sides of the truck and/or trailer. It is desirable that such a dock shelter not only permit complete and unobstructed trailer access, but also provide outstanding weather protection. The shelter herein is mounted along the outer perimeter of the door opening of the warehouse or terminal building. It is imperative that such a shelter permit free access to the truck door opening and that a truck/trailer hinge gap closure be closed upon its sides during loading and unloading. Likewise, the vehicle should be sealable by a head curtain within the shelter. More specifically, the invention is a hinge gap closure unit which may be retrofitted to existing storage shelters in truck/trailer loading and off-loading. The unit is sufficiently versatile to accommodate a truck trailer which is out of position relative to a dock center as defined by the building construction. The dock center is determined by bumpers and dock sills which are operatively disposed, adjacent the door opening of the building.

DISCUSSION OF THE PRIOR ART

There follows a listing of the patented art as it relates to the side curtain assembly for trailer hinge gap closure of this invention:

| | | |
|---|---|---|
| FROMMELT | 19/28/75 | Pat. No. 3,915,142 |
| FROMMELT | 6/22/86 | Pat. No. 4,601,142 |
| BENNETT | 1/27/87 | Pat. No. 4,638,612 |
| LAYNE | 12/08/87 | Pat. No. 4,711,059 |
| FROMMELT | 2/21/89 | Pat. No. 4,805,362 |

In none of the afore-cited patents is the combination of applicant's shelter with hinge gap closure shown or described. The following description, drawings and claims define the distinctive coactive relationship of key elements of the invention.

SUMMARY OF THE INVENTION

Every time one opens a warehouse loading door to gain access to a tractor trailer, there is a transfer of inside and outside air that causes building energy loss. With an open, unsealed 8'×8' loading door, this may currently cost some thousands of dollars a year per door in heating energy loss and in excess of a thousand dollars a year per door in air conditioning energy loss. (Research reported by Plant Engineering, May 1984.) The present form fitting dock seal units are retrofitted to existing shelters to present an effective barrier between the two listed environments, while permitting materials handling personnel unobstructed access to the trailer and its contents.

This is a loading dock shelter with hinge gap closure elements wherein reinforced side assemblies seal corner/hinge areas, as a trailer is backed into a loading dock, to thereby form a protective weather seal. Excessive pull on the side curtains is compensated for by a pair of opposed spring-loaded gap fill assemblies, connected to existing shelter side frames. The present hinge gap closures, having cantilevered side assemblies for right and left portions of the shelter, are each adapted to be set parallel to the upright door jam of the dock in the normal position, when the dock is not in use, thereby protecting the door as indicated. When in use, that is to say, when the trailer is in the dock, the reverse mobility of the truck/trailer causes the assemblies to be deflected from normal inoperative position, and to extend them along the sides of the open trailer swing doors, whereby the assemblies fill left and right gaps created by the truck and its swing doors, preparatory to and during loading and off-loading. To effect these functions, a spring loaded hinge functions to close in extension of the side frame of the shelter when not in use and when in use to be moved arcuately inward from the side frame of the shelter toward the trailer body and its swing doors. Its attached side curtain is thus extended inwardly toward the door, to seal the gap between trailer and shelter. The assemblies move from the side frames of the shelter to operative position, to fill all exposed portions of the gaps between the terminus of the side curtain and the side frames of the shelter. Left and right assemblies are independently moveable. Thus a complete seal is presented as between the trailer which may or may not be centered in the dock.

BRIEF DESCRIPTION OF THE DRAWINGS

FIG. 3 is an enlarged partial view in elevation depicting one unit of the FIG. 2 assembly, reference lines 2—2 of FIG. 1.

FIG. 4 is an enlarged partial section view of one curtain assembly according to the invention, reference section 4—4 of FIG. 3.

DESCRIPTION OF THE PREFERRED EMBODIMENTS:

A conventionalnal building defines a door with a conventional overhang atop and appropriate vehicle bumpers below dock. Shelter side frames are secured right and left of the door, outwardly of the bumpers. These side frames are held up by shelter supports, which in turn are secured rearwardly on the building.

A shelter 100, formed to protect the open end of a docked truck/trailer rests upon the support at the dock bottom and has rooftop support on the building beneath its overhang to which it is attached by conventional means.

Whereas shelter 100 would appear to comprise a conventional loading dock shelter having head and side frames attached to the building and shelter supports, its interior varies substantially from the norm. Protruding from the shelter is a reinforced head curtain 110 with depending side mirror image lefthand and righthand hinged gap closures 200, the side curtains being secured to shelter side frames 150. The unit of the shelter is, as indicated, substantially greater in lateral dimension than the door of the building, its side frame assemblies resting upon the shelter supports. Characteristically, the height of the shelter is thus substantially greater than the door height and the shelter unit width is substantially greater than the building door width. The unit projects a conventional distance from the building at its top and bottom and optionally supports at the top, either an inflatable head bag or a flexible head curtain to create a seal against the top of the trailer.

Figure 2:
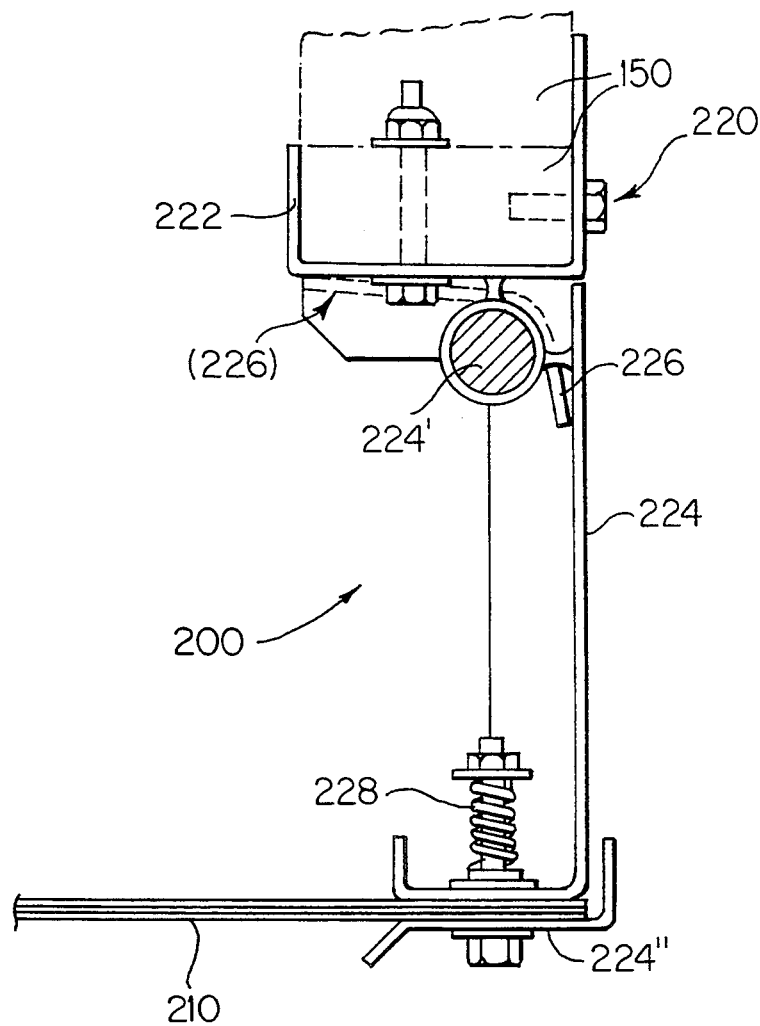
FIG. 2 is partial section view of the invention depicted in FIG. 1, illustrating the inoperative mode of one hinge gap closure.

Referring to the righthand hinge gap closure 200, and hinge assembly 220, FIGS. 2 and 3, it comprises opposed curtain elements 210 which are made of DYNA-LON TM side curtain fabric, supported by contiguous contact with transversely pocketed stays 212–212', FIGS. 3 and 4, which extend from the hinge leaf 224, FIG. 2, hereinafter defined. On the free end of the curtain 210, the ends of the side curtain stays terminate in contact with flexible angle 214, that angle being riveted to the free end of the curtain assembly 210 by means of aligned rivets 214', reference FIG. 4. Angle 214 extends substantially the entire vertical distance of the side curtain assembly, providing thereby an anchor for coextensive pad support channel member 216. The channel 216 is retained thereupon by plural bolt, lock washer and jam nut 216'.

Figure 1:
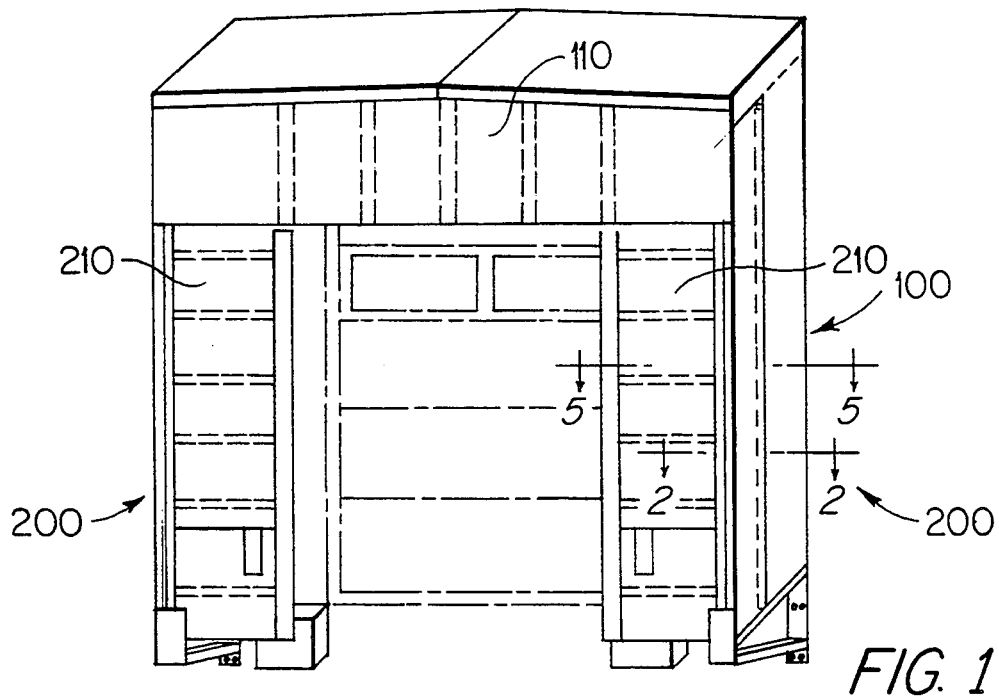
FIG. 1 is a view in perspective of a dock shelter with hinge gap closures, according to the invention.
Figure 5:
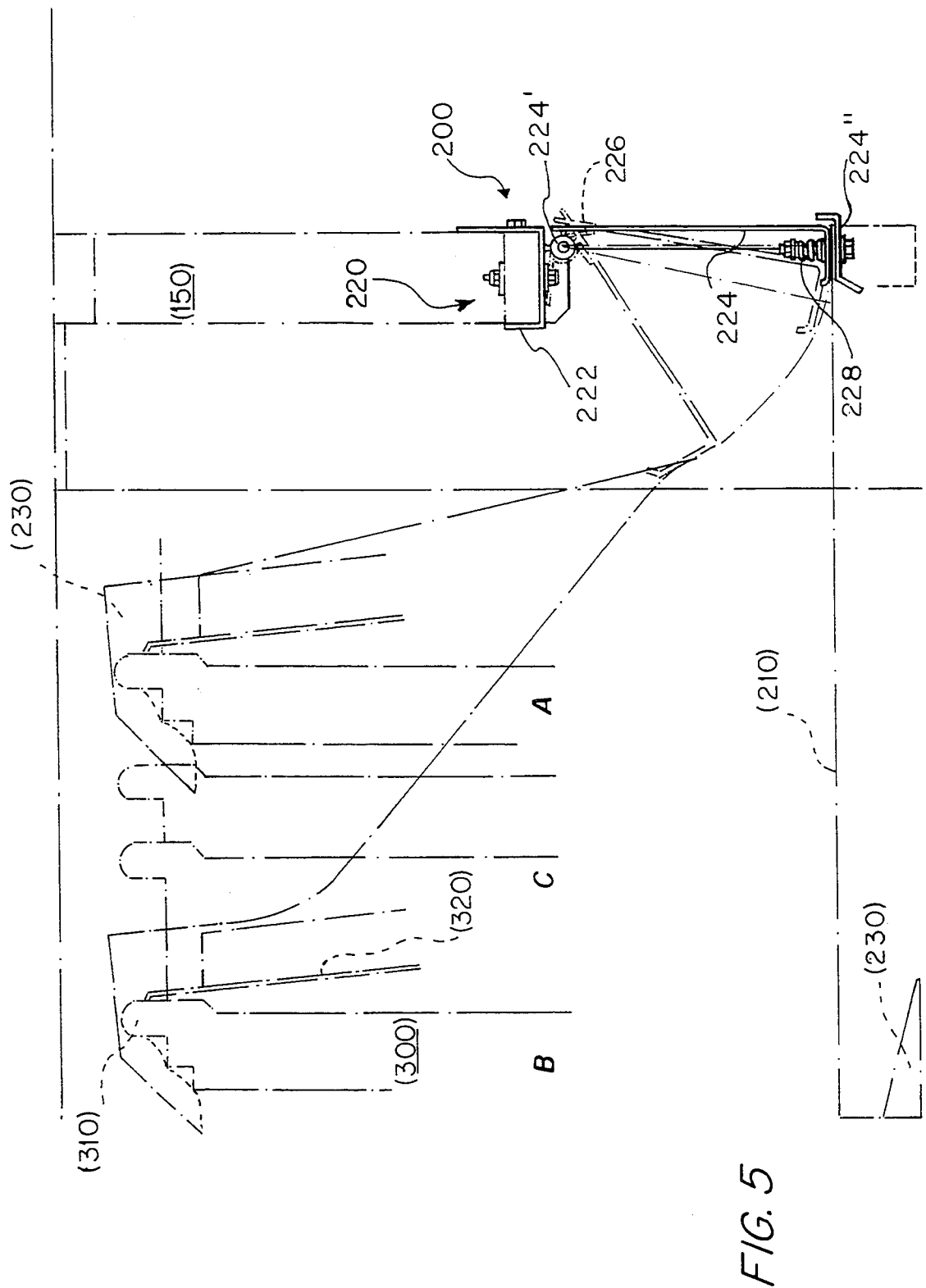
FIG. 5 is a schematic plan view of one curtain assembly, depicting both operative and inoperative modes thereof.

Referring again to FIG. 2, hinge assembly 220 is mounted at its proremal end upon side frame front cap 222, the same being secured to shelter frame 150 at its projecting free end. In this instance a right side shelter frame and cap are shown in top plan. The side curtain hinge leaf 224 has rotatable contilever hinge connection with hinge pin 224'. At the opposite end of hinge leaf 224 is vertical trim strip 224", this being retained in operative relation to the latter by means of compression spring 228. The curtain 210 is thus held at its anchor end between elements 224–224" of the hinge, located at the distal end thereof. Torsion spring 226 is set onto the side frame front cap 222, such that its engagement by the hinge leaf 224 will resist clock-wise movement as the assemblies 210-220-230 are activated by the truck/trailer reversibly moving into docking position, as indicated in FIG. 5. A closing rebound effect upon the assembly will occur upon truck forward release of the closures 200. Whereas a single righthand closure assembly 200 is shown, opposed righthand and lefthand mirror image closures 200 are required to close the gap between the respective sides of the open truck door and the dock door, reference FIG. 1.

At the free end of each curtain element 210 is vertically extending angle 214. See rivets 214' of FIG. 4, binding the curtain and its stays 212-212' together. Channel 216 is compressibly secured to angle member 214 by means of the combination screw, washer, nut arrangements 216', whereas appropriate aluminum pop rivets 216" secure the cover and core to the channel anchor plate 216, as shown in FIG. 4. Secured to channel 216 by rivets 216", is closure pad 230, preferably formed of polyurethane foam. This five-walled pad extends vertically at the terminus of the curtain assembly 210 and is partially coextensive with the height thereof. Contiguous to channel member 216 is anchor wall 232 of pad column 230, joined at a right angle to pad intermediate wall 234, which in turn is joined at another right angle by the shorter connecting wall 236, said connecting wall being parallel to anchor wall 232. Angularly offset from the connecting wall 236 is truck hinge striker wall 238, which in turn joins at an obtuse angle, intermediate wall 234'. This wall 234' is parallel to its counterpart, intermediate wall 234 and connects at a right angle to the anchor wall 232. Both intermediate walls 234 and 234' are penetrated by multiple pop rivets 216" which are in vertical alignment with the center of parallel channel 216 extensions. These extensions are normal to the angle member 214. The entire pad column is bounded on its five sides by a DYNAFLEX (T.M.) cover 230' which conforms to exposed exterior walls of the pad core. The cover has a durable and stretchable characteristic. Pad walls 232, 234 and 234', are encompassed by U-shaped channel and anchor plate 216, retaining the anchor portion of the pad core 230 against displacement during its forcible transition from inactive to active position by virtue of sliding contact of the truck/trailer hinge with the walls 236 and 238, in that order.

In FIG. 5, the basic operative function of a righthand side curtain assembly 200 appears, schematically. The function of a lefthand closure 200 is a mirror image duplicate of the function of the righthand closure, FIG. 5. To depict the function more realistically, one must consider whether or not the truck/trailer 300 may be centered in the dock or out of position, viz., to the right or to the left of dock center. It will be apparent that when the trailer is out of position to the right, the gap angle between moveable hinge leaf and shelter side wall projection is small; whereas, when the trailer is out of position to the left, the angle between moveable hinge leaf and shelter is comparatively greater. See FIG. 5. The exact opposite effect will occur as a lefthand assembly is displaced.

More specifically, as vehicle 300, having hinge 310 and door 320 has been backed into docking position A, it is offset to the right of dock center positions C. The two positions C represent the displacement of a narrower trailer to the left and a wider trailer to the right. The hinge assembly 200 with curtain 210 is now positioned with the truck hinge upon seal 230 into this impinging position A. The truck/trailer is out of position to the right. Here the actuation of hinge is lesser when compared to the position B wherein vehicle 300, its hinge 310 and door 320 are offset to left of the dock center positions C.

In operation, as the righthand hinge assembly 200 responds to vehicular pull on the curtain, the trailer being out of position to the right of dock center, the leaf component 224 moves arcuately inwardly. Its extensions are pushed from the position of repose into that shown as the intermediate position on the schematic diagram of FIG. 5. On the contrary, as the truck/trailer may move out of position to the left of dock center, the leaf of the hinge is pulled to the extreme upper position, whereby the gap between truck and dock door is filled, by gap pad 230. By virtue of the compression characteristic of the respective hinge and its torsion spring, these elements when released will move back to the position of repose first shown and described, relative to the shelter projection 150 viz., the inoperative position. These gap closing functions of curtain 220 and seal 230 are clearly depicted in the respective positions A-B-C illustrated in FIG. 5.

Having defined the intention with reference to specific drawings, the scope is set forth by the metes and bounds of the annexed claims.

We claim:

1. The combination with a storage terminal having dock, door and truck/trailer shelter with projecting, opposed shelter side frames, each frame projecting from the storage terminal wall and curtain assemblies thereon for truck/trailer hinge gap closures comprising:

a) opposed mirror image truck/trailer hinge units, each unit comprising an elongated single leaf hinge with curtain clamping means on a distal end of each hinge, the hinge being fixed and anchored at its proximal end to a fixed projecting dock side frame, said hinge unit being restrained by torsion extension-compression means, abutting the shelter side frame;

b) opposed reinforced side curtains, each said curtain being clamped on its near end to the hinge, substantially perpendicular to respective side frames and parallel to the storage terminal wall, respective curtains being laterally reinforced by transversely disposed stays and longitudinally reinforced by at least one vertically disposed stay;

c) a compressible hinge gap closure seal for each side curtain, resiliently anchored to the side curtain on a far end thereof, said seal comprising a fabric encased, vertically extending and elongated pad, bounded by five interconnected walls, there being a first anchor wall to which is connected an elongated intermediate second wall and a shorter intermediate third wall which is parallel to the second intermediate wall, both said intermediate walls being disposed normal to the anchor wall; a fourth hinged striker wall connected at an obtuse angle on its outer end to the third wall and connected at an acute angle to a fifth wall, said fifth wall connecting both said second and fourth walls, whereby upon rearward displacement of the curtain by a truck/trailer, respective hinge gap closure seals will be forcibly displaced rearwardly and any gaps existing between truck/trailer body and dock door will be closed, relative to the shelter side frame.

* * * * *